United States Patent
McKeen et al.

(10) Patent No.: US 8,616,283 B2
(45) Date of Patent: Dec. 31, 2013

(54) PROCESS FOR TREATING WATER IN HEAVY OIL PRODUCTION USING COATED HEAT EXCHANGE UNITS

(75) Inventors: Laurence Waino McKeen, Sewell, NJ (US); Michael Albert Hooper, Calgary (CA)

(73) Assignee: E I du Pont de Nemours and Company, Wilmington, DE (US)

( * ) Notice: Subject to any disclaimer, the term of this patent is extended or adjusted under 35 U.S.C. 154(b) by 464 days.

(21) Appl. No.: 12/948,999

(22) Filed: Nov. 18, 2010

(65) Prior Publication Data

US 2011/0139451 A1   Jun. 16, 2011

Related U.S. Application Data

(60) Provisional application No. 61/285,687, filed on Dec. 11, 2009.

(51) Int. Cl.
 *E21B 43/24* (2006.01)
 *E21B 36/00* (2006.01)
 *F28F 13/18* (2006.01)

(52) U.S. Cl.
 USPC ............ 166/303; 166/57; 166/267; 165/133; 122/7 R; 427/239

(58) Field of Classification Search
 USPC ........... 166/302, 303, 57, 267; 427/230, 239; 165/133; 122/7 R, 4 D, 31.1, 33
 See application file for complete search history.

(56) References Cited

U.S. PATENT DOCUMENTS

| 3,087,827 A | 4/1963 | Klenke, Jr. et al. |
| 3,087,828 A | 4/1963 | Linton |
| 3,087,829 A | 4/1963 | Linton |
| 3,356,108 A | 12/1967 | Johnston |
| 3,891,496 A | 6/1975 | Erwin |
| 5,603,909 A * | 2/1997 | Varner et al. ............... 423/239.1 |
| 5,972,494 A | 10/1999 | Janssens |
| 7,077,201 B2 | 7/2006 | Heins |
| 7,575,789 B2 | 8/2009 | McKeen |
| 7,604,052 B2 * | 10/2009 | Roes et al. .................... 166/267 |
| 2003/0049485 A1 * | 3/2003 | Brupbacher et al. .......... 428/615 |
| 2006/0108110 A1 | 5/2006 | McKeen |
| 2007/0284108 A1 * | 12/2007 | Roes et al. .................... 166/302 |
| 2009/0266437 A1 | 10/2009 | McKeen |
| 2009/0272479 A1 | 11/2009 | McKeen |

FOREIGN PATENT DOCUMENTS

| JP | 2007163115 A | 6/2007 |
| WO | 2009014596 A1 | 1/2009 |

OTHER PUBLICATIONS

Authorized Officer Renato Serra, International Search Report, dated Mar. 2, 2011, for PCT/US2010/059202.
Sugama, T., et al, "Poly(Phenylenesulfide)-Based Coatings for Carbon Steel Heat Exchanger Tubes in Geothermal Environments," Journal of Materials Science 37 (2002) 4871-4880.

\* cited by examiner

*Primary Examiner* — Shane Bomar
*Assistant Examiner* — Catherine Loikith

(57) ABSTRACT

A process for treating a water stream produced in the recovery of heavy oil from geological formations. The process includes use of a heat exchange unit having at least one tube having a multi-layer coating. The multi-layer coating includes a melt flowable copolymer of tetrafluoroethylene adhered to the interior surface or exterior surface of the tube.

13 Claims, 3 Drawing Sheets

PROCESS FOR TREATING WATER IN HEAVY OIL PRODUCTION USING COATED HEAT EXCHANGE UNITS

FIELD OF THE INVENTION

This invention relates to a process for treating water using coated heat exchange units that alter the temperature of a water stream which has been separated from a stream of heavy oil when extracting the oil from geological formations and to the mitigation of fouling of the heat exchange unit.

BACKGROUND OF THE INVENTION

As the world's supply of conventional light crude is slowly diminished, challenging resources like the oil sands have become more economically attractive as sources of heavy, viscous oil also referred to as bitumen. Many methods for the production of heavy oil from geologic formations employ heated water and/or steam as the fluid medium to transfer heat to the targeted deposit, thereby reducing the viscosity of the hydrocarbon and allowing for more economic extraction of the heavy oil component. Two common thermal steam methods are Steam-Assisted Gravity Drainage (SAGD) and Cyclic Steam Stimulation (CSS). When steam or warm water is injected into a reservoir for this purpose, there is generally a significant amount of water carried along with the produced oil stream in the form of an emulsion. Water must be separated from this emulsion to yield relatively pure heavy oil or hydrocarbon for sale and pipelining. In many heavy oil operations, it is critical to further treat the separated produced water so that it may be recycled and reinjected downhole as liquid or steam to continue the heavy oil extraction process. In the specific case of SAGD operations, produced water must undergo significant treatment to ensure it is of sufficient quality (purity) for use as feed to once-through steam generators (OTSGs) or drum boilers typically used for the generation of steam for injection downhole into underground geological formations. Cyclic Steam Stimulation (CSS) is an example of another method for recovering heavy oil that involves injection of steam and treats the water stream produced in recovering the heavy oil. Whereas SAGD is a continuous injection process, CSS employs a cyclic process wherein the steam is injected and allowed to soak into the reservoir for a period of weeks or months before the well is switched to production.

A major concern with the use of heat exchangers for the heating and cooling of produced water streams in heavy oil processing is the propensity of these units to foul with various constituents of the treated stream. Hydrocarbon components such as bitumen and asphaltenes are notoriously tenacious foulants that adhere readily to tube walls and process equipment, thereby severely reducing the heat transfer capacity of the heat exchanger and, in many cases, restricting the maximum throughput of the entire water treatment system. The SAGD water treatment process in particular is prone to extreme fouling due to the high concentrations of asphaltenes, organic acids, scaling compounds and various dissolved or suspended solids that must be separated from the treated water stream before it can be reboiled to produce steam. Treatment of water in heavy oil operations is more fully explained in U.S. Pat. No. 7,077,201 B2 to Heins of GE Ionics, Inc.

One possible solution proposes to prevent fouling by coating the tube surfaces with epoxy coatings. However, such epoxy coatings have not been able to reduce extreme fouling.

SAGD operators have implemented numerous measures to mitigate the heat exchanger fouling problems with minimal success to date. Advanced cleaning methods, including chemical injection, heat sweeping and flow pulsing have been employed with little financial or productive benefit, while alternate exchanger designs (i.e., helically baffled, spiral-wound, etc) have also been employed more recently. Initial indications are that these alternate designs have little impact on the fouling rates observed at SAGD sites.

In WO 2009/014596 to Chakrabarty to Exxon Mobil Upstream Research Company, the problem of fouling in vessels used in a paraffinic froth treatment process which extracts bitumen from mined oil sands is discussed. Although fluorocarbon polymers adhered to the surface of a vessel or conduit are described as producing a reduction in the fouling observed on the surface, surfaces of molded PTFE are exemplified while sprayed fluoropolymers, especially those containing additives or fillers, were found to be ineffective.

SUMMARY OF INVENTION

The invention relates to a process for treating a water stream produced in the recovery of heavy oil from geological formations. The process includes a) injecting steam underground into a geological formation containing hydrocarbons and establishing a steam chamber; b) transferring heat from the steam chamber to the formation and mobilizing hydrocarbons for extraction from the formation; c) extracting the mobilized hydrocarbons from the formation and the hydrocarbons forming an emulsion with a portion of condensed water formed from the steam; d) separating mobilized hydrocarbons as a heavy oil product from the hydrocarbon-water emulsion to produce a water stream containing foulants that include residual hydrocarbons and solids; e) passing the water stream through a heat exchange unit comprising at least one tube wherein the tube has a multi-layer coating comprising a melt flowable copolymer of tetrafluoroethylene adhered to the interior surface or exterior surface of the tube; and f) removing foulants from the water stream while altering the temperature of the water stream as the water stream passes through the heat exchange unit; wherein the multi-layer coating provides an anti-stick (or non-stick) surface that reduces the deposition of foulants, on the interior or exterior surface of the tube as compared to the surface of the tube without the multi-layer coating being present, so as to avoid loss of efficiency in heat transfer and pluggage of the heat exchange unit.

In a further embodiment, the multi-layer coating is adhered to the interior of the tube by applying a primer layer to the interior surface of the tube and an overcoat is disposed on top of the primer layer. The overcoat comprises multiple layers including a lower layer and an upper layer and the upper layer has an exterior anti-stick surface consisting essentially of baked perfluoropolymer. In another embodiment, the lower layer of the overcoat comprises a plurality of particles which provides a mechanical barrier against permeation of water to the tube.

DETAILED DESCRIPTION OF THE INVENTION

Figure 1:
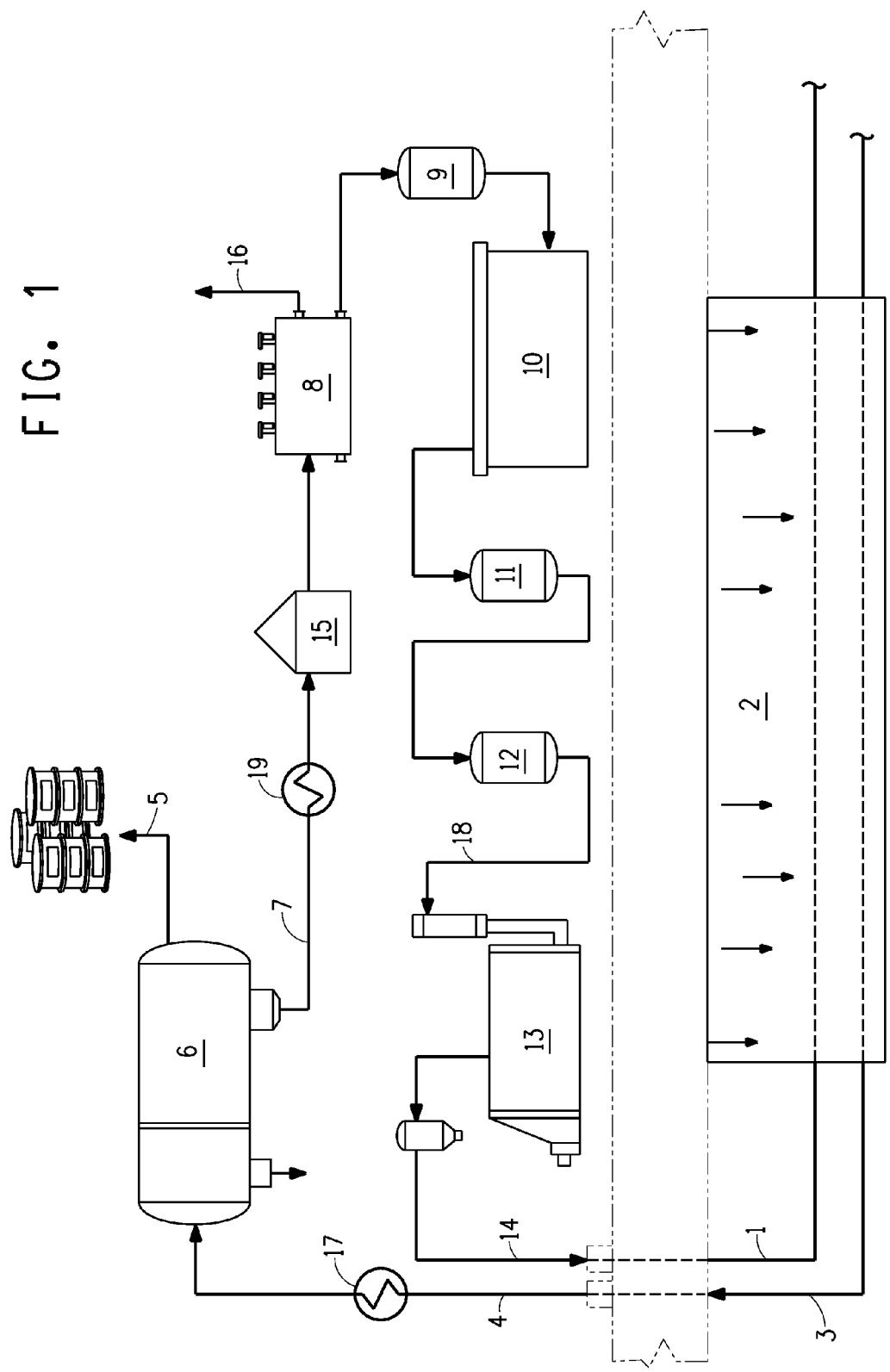
FIG. 1 is a schematic of the SAGD (steam assisted gravity drainage) process which illustrates the recovery of heavy oil and the water treatment process of this invention.

A typical process for treating water produced during heavy oil recovery is illustrated in FIG. 1 as exemplified by using steam assisted gravity drainage (SAGD). Although SAGD is illustrated, the present invention also extends to other oil recovery processes that use steam or hot water injection such as Cyclic Steam Simulation (CSS).

In FIG. 1, a given quantity of high quality steam is injected underground into a geological formation by means of a steam injection well (1), which forces the steam out and into the reservoir adjacent to the well. The injected steam, which may be in combination with other injectants (for example, hydrocarbon solvents to further reduce the viscosity of the targeted bitumen or heavy oil), establishes a steam chamber (2) around the injection well within which heat is transferred to the formation, thereby reducing the viscosity of the hydrocarbon component and mobilizing it so that it may be extracted from the formation. In the case of a SAGD heavy oil operation, the mobilized hydrocarbon is bitumen, which is mobilized by the transfer of heat from the steam. Hot steam initially moves outward from the injector well (1) and gives up heat to the formation as it penetrates into the reservoir, eventually establishing the vertical maximum (ceiling) and boundaries (walls) to the steam chamber (2). As bitumen receives heat from the steam, it becomes less viscous, to the point where it will drain, along with a portion of the condensed water, under the force of gravity and migrate downwards through the formation as depicted by the black directional arrows in FIG. 1. A second well or pipe, the producing well (3) is located below the injector well (1) and acts to gather the draining hydrocarbons and water emulsion and move it to the surface, generally via the use of artificial lift systems such as electrical submersible pumps.

Once the produced water and hydrocarbon emulsion (4) is pumped to the surface, the valuable heavy oil product (5) is separated for sale or distribution in a series of steps, beginning with the oil water separator (6). Oil water separators can take many forms, and in the SAGD system they generally take the form of gravity-driven free water knockout (FWKO) systems (6). The produced water stream (7), after initial separation, contains foulants including but not limited to: residual hydrocarbons, and dissolved or suspended solids as will be further discussed below. The water stream is sent through a series of steps to remove the foulants. These steps are designed to recover all available oil as well as to eliminate adverse impacts, such as corrosion, fouling and pluggage, associated with the presence or precipitation of residual hydrocarbons, solids and other foulants during downstream processes used in the recycling of water. Other typical steps in the de-oiling of produced water, which can be used independently or in combination, target specific contaminants found in the produced water stream. For example, the water stream is passed to a skim tank (15) and then to an induced gas flotation (IGF) unit (8).

Induced gas flotation units eliminate suspended matter including residual hydrocarbons or solids via the infection of air bubbles that adhere to the suspended particles, causing them to float to the surface of the tank at which point they can be skimmed off 16. Variations of IGF, including dissolved air flotation (DAF) and froth flotation are also used for this purpose. Oil filters (9) are another common separation step, generally designed to remove residual oil that would foul downstream processes in even minute quantities. The most common type of filter used in the treatment of SAGD produced water is the walnut shell filter, so named because of the walnut shell grains used as the filtration medium. A precipitation softening process is subsequently used to reduce water hardness, alkalinity, silica, and other constituents, with the most common type found in SAGD being warm lime softening (10). Finally, a series of filters designed to eliminate additional contaminants ensues, often including, for example, anthracite filters (11) for fine solids removal and weak acid cation (WAC) exchangers (12) for residual hardness. Following these various treatment steps, water quality is generally sufficient for introduction to a boiler unit such as an OTSG (13). The boiler unit boils the liquid water and in conjunction with a steam separator produces high quality steam (14) for reinjection downhole into the reservoir. Typically, in an OTSG, about 80% quality steam (80% vapor, 20% liquid, by weight) is produced at about 1000 pounds (6894 KPa) per square in (psig) or up to as much as 1800 psig (12,400 KPa).

Steam injection pressures for SAGD at startup are typically in the 3,000 (435 PSI) to 6,000 kPa (870 PSI) range and are generally higher than the reservoir pressure to force steam into the formation. When the steam chamber has been established and the well is switched to production mode, steam injection pressures are reduced nearer to the reservoir pressure. This generally means 2000 to 4000 kPa (290-580 PSI) but producers have been moving to lower-pressure SAGD to minimize steam costs and losses to as low as about 1500 kPa (218 PSI), or even lower to 1000 kPa (145 PSI)). Steam quality can be typically in the 95 to 100% range, with wellhead pressures as high as 11 MPa (1595 PSI).

As will be explained below, the water treatment system uses heat exchanger units to transfer heat between various fluid streams in the treatment process to minimize energy inputs to the process and to avoid challenging operating conditions—such as high temperature and high pressure vessel processes—that can be hazardous or necessitate more expensive equipment solutions. Heat exchanger units come in many designs, however, shell and tube heat exchangers are dominant, and can be used between various process steps to maximize heat recovery or prepare fluid streams for subsequent processing. By shell and tube is meant where heat transfer occurs between the interior of the tube (tube side) and the exterior of the tube (shell side). Such heat exchange units are depicted in FIG. 1 at (17) and (19) and in FIG. 2 at (21), (22), (23) and (24).

Many variations of this water treatment process are found across the industry as operators strive to optimize the recycle of water and minimize costs, footprint and environmental impact. For example, even within the SAGD subset of heavy oil production, operators commonly use varying methods for the generation of steam, including OTSGs, drum boilers and hybrid boilers (not shown). Various combinations of treatment processes are also used, with the nature and design of each process varying considerably from site to site (or even across a single site) depending on the specific composition of the produced oil and water stream and the goals of the operator. Although steam has been used for the purpose of illustration, other thermal treatments may use warm water or may use other solvents in addition to the steam or water. For instance solvents such as naphtha, iso-pentane and n-pentane may be injected.

Water treatment associated with heavy oil production takes many forms, with the traditional SAGD process depicted in FIG. 1 being only one possible variation. Other water treatment processes exist, and recently the use of evaporators with mechanical vapor recompression and more traditional drum boilers has become a commonplace alternative to the use of warm lime softening and OTSGs in the SAGD industry. Other heavy oil recovery processes can use any number of variations on some or all of the water treatment processes described herein.

In FIG. 1, several shell and tube heat exchangers are depicted. The inlet cooler (17) is used to extract heat from the produced hydrocarbon and water emulsion being pumped up from the well, to prepare it for the first separation step in the FWKO. Typically, this involves cooling the hydrocarbon and water stream from its production temperature (about 170° C.) to an appropriate temperature for separation in the FWKO (about 125° C.). To maximize the energy efficiency of the SAGD site, the inlet cooler typically uses the boiler feedwater stream (18) as a coolant fluid, thereby raising the temperature of this stream to reduce the amount of energy that must be used to boil it in the OTSG. After separation in the FWKO, the produced water stream undergoes further cooling in the produced water coolers (19) to prepare it for storage in the skim tanks, which must operate below 90° C. to avoid dangers associated with boiling vapors overhead or high pressure operations. Produced water coolers thus aim to reduce the temperature of the produced water stream from about 125° C. to below 90° C. Because this temperature differential is small, the heat extracted from the produced water stream is generally of low quality and is simply rejected to the atmosphere. For this reason a closed-loop glycol coolant is generally used and heat is dissipated to the atmosphere.

Figure 2:
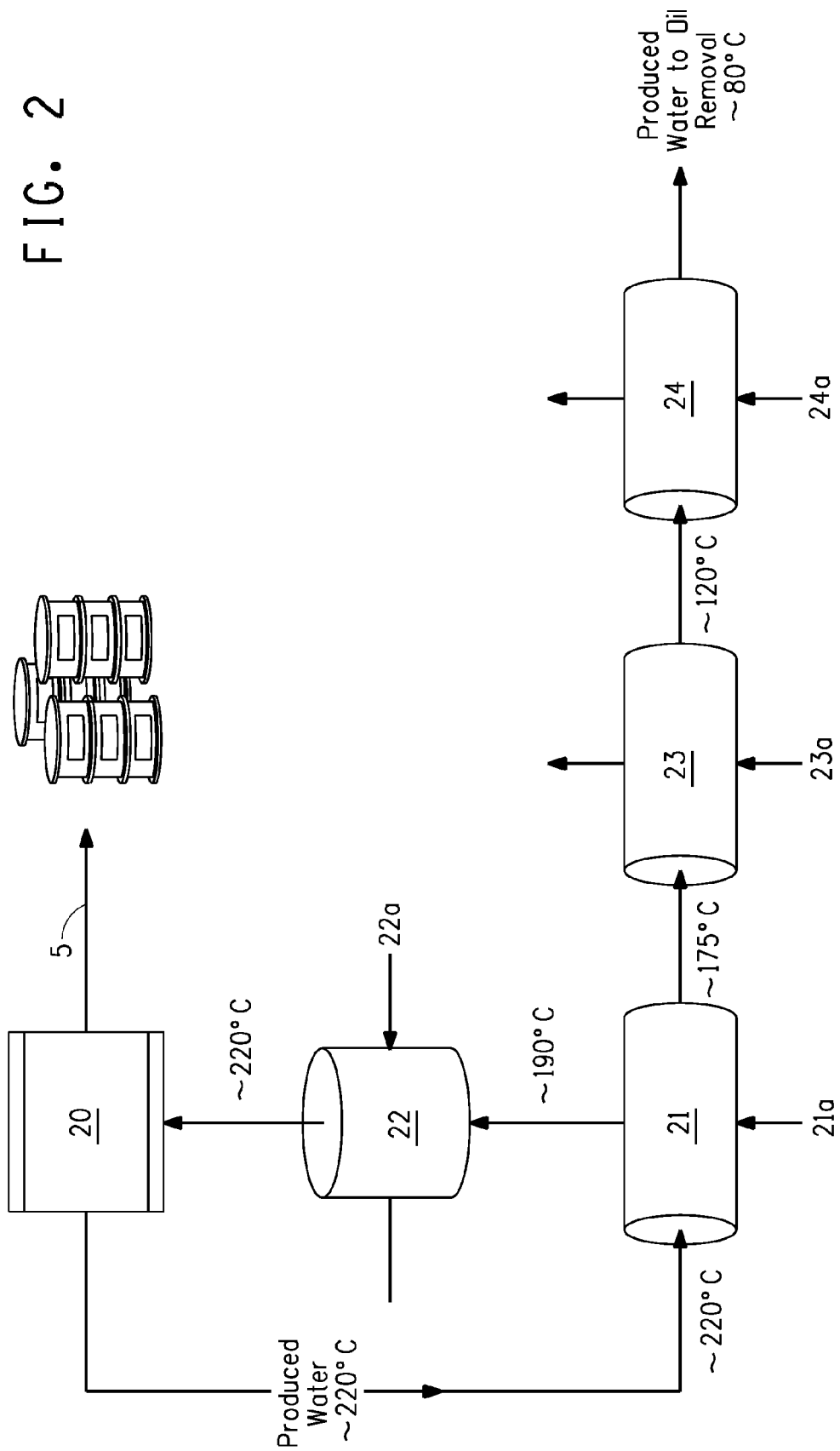
FIG. 2 is a schematic of the inverted SAGD (steam assisted gravity drainage) process which illustrates the recovery of heavy oil and the water treatment process of this invention.

At other SAGD sites, a process known as "Inverted SAGD" is used as illustrated in FIG. 2. Inverted SAGD uses a high temperature separation (HTS) step (20)—instead of a FWKO—to raise the temperature of the hydrocarbon (bitumen) and water emulsion. The density of water is reduced at a greater rate than that of the bitumen component as the temperature of the emulsion increases, causing the bitumen component to drop under gravity to the bottom of the HTS vessel, at which point it can be easily separated. So unlike the traditional FWKO gravity separation process, which sees bitumen rise to the top and water drain out the bottom, the HTS process causes an inversion in the liquid densities, resulting in product oil on the bottom and water on the top. Hence, the use of the term "Inverted SAGD".

The Inverted SAGD operation uses a system of heat exchangers, as depicted in FIG. 2, to exchange heat with other process streams at the SAGD site so that additional energy inputs are minimized. As a first step, and in contrast to the traditional SAGD operation, the hydrocarbon and water emulsion from the producing wells is heated to prepare it for the HTS (20) process. This is accomplished in two successive heat exchangers, by transferring heat to the produced hydrocarbon and water emulsion from warmer fluid streams, namely the HTS produced water effluent in Heat Exchanger (21) and the steam condensate (22a) from the boilers, in Heat Exchanger (22), respectively. Two more heat exchangers, Heat Exchanger (23) and Heat Exchanger (24) are then used to reduce the temperature of the produced water stream from 175° C. to prepare it for storage in the skim tanks, which again must operate below 90° C.

In many of the scenarios described above, produced water is passed on the tubeside (inside of the tube) and heat is transferred to the fluid stream flowing on the shellside (exterior of the tube). In FIG. 2, the shellside medium can vary depending on process needs and can be glycol, produced water or some other fluid stream on site (such as boiler feedwater or steam condensate) as the requirements dictate. In certain cases the produced water can be passed on the shellside rather than the tubeside. For example, produced water (21a) is used shellside for Exchanger (21), whereas steam condensate (22a) is used shellside for Exchanger (22), boiler feedwater (23a) is used shellside for Exchanger (23), and glycol (24a) is used shellside for Exchanger (24).

A major concern with the use of heat exchangers for the heating and cooling of produced water streams in heavy oil processing is the propensity of these units to foul with various constituents of the treated stream. Hydrocarbon components such as bitumen are notoriously tenacious in forming deposits that adhere readily to tube walls and process equipment, thereby severely reducing the heat transfer capacity of the heat exchanger and, in many cases, restricting the maximum throughput of the entire water treatment system. One means of determining the affinity of bitumen for a surface is to measure the bitumen contact angle. As will be shown in the examples, multi-layer fluoropolymer coatings of this invention have contact angles at least about 35 degrees, preferably in the range of about 35 to about 75 degrees. More preferably in the range about 45 to about 65 degrees.

The SAGD water treatment process in particular is prone to extreme fouling due to the high concentrations of foulants including residual hydrocarbons (bitumen and asphaltenes), organic acids and solvents, scaling compounds (soluble inorganic compounds such as calcite and/or barite) and various other dissolved or suspended solids that must be separated from the treated water stream before it can be reboiled to produce stream. Such acids include naphthenic acid, n-heptane, n-hexane, naphtha, iso-pentane and n-pentane which may be added to help in extraction. Such solids may include mineral solids such as aluminosilicate clay crystallites. The resultant insoluble materials tend to plate out on the interior surface of the tube, restricting flow therethrough and eventually plugging the tubing. This requires the tubes to be cleaned out and necessitates the need for redundant systems to avoid down time in oil production.

According to the present invention, a multi-layer coating comprising fluoropolymer adhered to the interior surface or exterior surface of at least one tube of the heat exchange unit provides an anti-stick surface that reduces the deposition of foulants including but not limited to residual hydrocarbons and solids, on the interior or exterior surface of the tube as compared to the surface of the tube without the multi-layer coating being present, so as to avoid loss of efficiency in heat transfer and pluggage of the heat exchange unit as will be described more fully below. As will be shown in the examples, in the present invention, the multi-layer coating has a thermal conductivity that remains at or above about 0.3 W/m-K over the temperature range of about 25° to about 260° C., thereby avoiding the loss of efficiency in heat transfer.

SAGD operators typically experience some degree of fouling in all heat exchangers used for the treatment of produced water and hydrocarbon emulsions, but specific units are historically recognized as the most extreme cases for rapid and tenacious fouling. The produced water coolers (19), (21), (22) and (23) typically operate over temperature ranges where precipitation of dissolved solids, including asphaltenes and organic acids, occurs resulting in heavy concentrations of fouling in these units. As the temperature of the water stream is altered by reducing the temperature of the water stream in one or more heat exchange units from about 220° C. to about 70° C., preferably about 180° C. to about 80° C., a number of solubility regimes are traversed, causing deposition of foulants that include residual hydrocarbons and solids as they drop out of solution and generally adhere to the first surface which they contact. The process of the present invention is especially useful wherein the temperature of the water stream is altered in one or more heat exchange units by an amount of at least about 25° C., and in other embodiments at least about 30° C., at least about 40° C., and at least about 50° C., as the stream passes through the heat exchange unit.

The process of the invention has particular utility when the water stream containing foulants that include residual hydrocarbons and solids comprises about 500 ppm hydrocarbons to about 25,000 ppm hydrocarbons and where the total dissolved solids are about 250 ppm to 10,000 ppm. Further the process of the present invention is useful when the flow of the water stream through the heat exchange unit is relatively slow, for example from about 1 ft/s (0.3 m/s) to about 5 ft/s (1.5 m/s), where longer residence times generally produce increased fouling in the absence of the process of the present invention.

The present invention is useful for all shell and tube heat exchangers, but more specifically is intended for those applications—such as SAGD produced water coolers—where the problem is particularly pronounced and where the costs associated with fouling merit consideration of a generally costly solution like a fluoropolymer coating. Fouling frequencies—the rate at which a unit fouls to the point where it must be cleaned or replaced—for many industrial heat exchangers typically occur on the scale of months to years. By comparison, fouling frequencies for SAGD produced water coolers are observed to be on the order of days to weeks. Cleaning practices, site downtime, lost production, chemical costs and energy costs associated with SAGD fouling in the produced water treatment process are extreme and can easily climb into the millions of dollars per unit or train on an annual basis. For this reason, the majority of SAGD producers have constructed redundant heat exchanger trains to allow water treatment and site bitumen production to continue even while heat exchangers are being cleaned or replaced. Such expenses can be reduced by adoption of the present invention.

The multi-layer coating either minimizes or eliminates (i) the deposition of foulants that includes residual hydrocarbon and solids, so as to minimize or eliminate loss of efficiency in heat transfer and/or pluggage of the heat exchanger tube(s) and (ii) corrosion of the surface of the tube(s). The reduction in deposition can be characterized by being at least 40%, preferably at least 50%, of at least one of residual hydrocarbon, foulants, and solids as compared to the surface of the tube without the coating being present. Reductions of at least 60%, 70%, 80% and even at least 90% may be realized. These reductions are also made in comparison to pipe lined with an epoxy resin.

These reductions are determined by the Bitumen Deposition Test, Asphaltene Deposition Test, and the Inorganic Scale Deposition Test respectively, disclosed in the Examples.

According to one embodiment of the present invention, the multi-layer coating is adhered to the interior surface of the heat exchanger tube with the coating exposed to the water stream being treated. In another embodiment, the multi-layer coating is adhered to the exterior (shell side) surface of the heat exchanger tube with the coating exposed to the water stream being treated. In yet another embodiment, both sides of the exchanger tube have a multi-layer coating adhered in order to mitigate fouling. It is contemplated that such multi-layer coating will be applied to surfaces within a heat exchange unit that are exposed to the water being treated. Such surface include tube sheets, flanges, shell and other item whenever there may be cause for fouling.

In one embodiment, the multi-layer coating is adhered to the interior of the heat exchanger tube by applying a primer layer to the interior surface of the tube; disposing an overcoat on top of the primer layer. Alternatively the primer can be applied to the exterior surface of the tube and the overcoat can be disposed over the primer.

While it is the primer layer that provides the adherence to the tube, it is the non-stick surface of the overcoat, i.e., the exposed surface of the overcoat that prevents the sticking of depositions from foulants that include residual hydrocarbons, such as bitumen and asphaltenes, and inorganic scale and other solids to the tubing thereby minimizing or eliminating plugging of the tube. The reduced deposition performance of the coated tube of the present invention is in contrast to the result obtained for uncoated tubes, as well as for epoxy or phenolic resin coated tubes.

In another embodiment the overcoat comprises multiple layers including a lower layer and an upper layer and wherein the upper layer has an exterior anti-stick surface consisting essentially of baked perfluoropolymer. In yet another embodiment, the lower layer of the overcoat comprises a plurality of particles which provide a mechanical barrier against permeation of water to the tube. The deposition reduction is accompanied by the added benefit of corrosion resistance, as compared to uncoated heat exchanger tube. The overcoat is impermeable to corrosive materials present in water stream and presents a non-stick surface to the water, whereby the insoluble organic materials present in the water do not stick to the overcoat. Because of its non-stick property, however, the overcoat does not adhere to the interior or exterior surface of the tube after contaminants are removed from tube surfaces. The intervening primer layer provides adhesion both to the overcoat and to the surface of the tube. The primer layer by itself does not provide sufficient non-stick character and impermeability to the corrosive materials present in the water to protect the tube surface from corrosion.

With the present invention, corrosion resistance can be quantified by Atlas Cell Testing as will be further explained in the examples. The coated tube used in the process of this invention has a corrosion resistance as measured by Atlas Cell of at least about 15 days, preferably at least about 20 days, more preferably at least about 30 days and even more preferably at least about 90 days.

The heat exchanger tubes used in the process of the present invention are preferably made from metal, such as steel. The tubes are of relatively small diameter. Inner diameters of about 0.375 in (0.95 cm) to about 2.0 in (5.1 cm), and lengths of at least about 10 ft (3 m), or even about 40 ft (12.2 m) are quite common.

The multi-layer coating as applied to the heat exchanger tube is relatively thin in order to minimize the heat insulation effects that may be imparted by the coating. The primer layer needs only to be thin enough to adhere the overcoat to itself. The primer layer is generally no greater than 1 mil (25 micrometers) thick and the overcoat is preferably 1 to 10 mils (25 to 250 micrometers) thick. In applications where very thin coatings are desired, the thickness of the overcoat is preferably 2-6 mils (51-152 micrometers).

The surfaces of the heat exchanger tubes, as manufactured, are generally smooth but with peaks and valleys and may be coated with preservative to minimize rusting. Before forming the coating on a tube surface, such surface should be treated to remove the preservative and any other contaminant. This removing step is aimed at providing a clean adherent surface for the overcoat layer to be adhered to the surface of the tube by using a primer layer to establish the rigorous bond needed between the surface of the tube and the overcoat, and between the primer layer and overcoat. In the present invention, the term adhered means that the coating would pass the Post Boiling Water Fingernail Adhesion (PWA) test and the cross-hatch adhesion test as set forth below.

Conventional soaps and cleansers can be used to remove the preservatives and contaminants. The tube can be further cleaned by baking at high temperatures in air, temperatures of 800° F. (427° C.) or greater. The cleaned surface can then be roughened, such as by chemical etching or grit blasted with abrasive particles, such as sand, metal shot, or aluminum oxide, to form a roughened surface to which the primer layer of the coating can adhere. The grit blasting is sufficient to remove any rust that may be present, thereby supplementing the cleaning of the surface. The roughening that is desired for primer layer adhesion can be characterized as a roughness average of about 70-250 microinches (1.8-6.4 micrometers). The multi-layer coating is formed on the surface of this treated tube. The coating follows the peaks and valleys of the surface of the tube and to some extent fills them in with the primer layer and the overcoat.

The overcoat of the multi-layer coating used in this invention comprises a melt flowable copolymer of tetrafluoroethylene so as to present an anti-stick surface to the water stream being treated. The primer layer optionally comprises a fluoropolymer or a perfluoropolymer. However, other materials may be used for the primer layer as long as they promote adhesion of the overcoat to the pipe.

In a preferred embodiment, the upper layer of the overcoat consists essentially of perfluoropolymer. In a perfluoropolymer, the carbon atoms making up the polymer chain, if not substituted by oxygen, are substituted with fluorine atoms. The end groups of the perfluoropolymer may also be entirely fluorine substituted, but other relatively stable end groups, such as —$CF_2H$ and —$CONH_2$, may be present, especially in the fluoropolymer present in the primer layer. The perfluoropolymer used in the present invention is melt flowable at the baking temperature, which will generally be in the range of 300° C. to 400° C. Polytetrafluoroethylene, which has a melt viscosity of at least $10^8$ Pa·s at 372° C., would not be melt flowable.

The perfluoropolymers used in the multi-layer coating are melt flowable copolymers of tetrafluoroethylene (TFE) and at least one fluorinated copolymerizable monomer (comonomer) present in the polymer in sufficient amount to reduce the melting point of the copolymer substantially below that of TFE homopolymer, polytetrafluoroethylene (PTFE), e.g., to a melting temperature no greater than 315° C. Preferred comonomers with TFE include the perfluorinated monomers such as perfluoroolefins having 3-6 carbon atoms and perfluoro(alkyl vinyl ethers) (PAVE) wherein the alkyl group contains 1-8 carbon atoms, especially 1-3 carbon atoms. Especially preferred comonomers include hexafluoropropylene (HFP), perfluoro(ethyl vinyl ether) (PEVE), perfluoro (propyl vinyl ether) (PPVE) and perfluoro(methyl vinyl ether) (PMVE). Preferred TFE copolymers include FEP (TFE/HFP copolymer), PFA (TFE/PAVE copolymer), TFE/HFP/PAVE wherein PAVE is PEVE and/or PPVE and MFA (TFE/PMVE/PAVE wherein the alkyl group of PAVE has at least two carbon atoms). Typically, the melt viscosity will range from $10^2$ Pa·s to about $10^6$ Pa·s, preferably $10^3$ to about $10^5$ Pa·s measured at 372° C. by the method of ASTM D-1238 modified as described in U.S. Pat. No. 4,380,618. Typically these copolymers will have a melt flow rate of 1 to 100 g/10 min as determined by ASTM D-1238 and ASTM tests applicable to specific copolymers (ASTM D 2116-91a and ASTM D 3307).

The fluoropolymers in the primer layer and the overcoat are preferably independently selected from the group consisting of (i) copolymer of tetrafluoroethylene with perfluoroolefin copolymer, the perfluoroolefin containing at least 3 carbon atoms, and (ii) copolymer of tetrafluoroethylene with at least one perfluoro(alkyl vinyl ether), the alkyl containing from 1 to 8 carbon atoms. Additional comonomers can be present in the copolymers to modify properties. Adequate intercoat adhesion is also obtained when one of the perfluoropolymers is copolymer (i) and the other is copolymer (ii). The melting temperature of the coating will vary according to its composition. By melting temperature is meant the peak absorbance obtained in DSC analysis of the coating. By way of example, tetrafluoroethylene/perfluoro(propyl vinyl ether) copolymer (TFE/PPVE copolymer) melts at 305° C., while tetrafluoroethylene/hexafluoropropylene melts at 260° C. (TFE/HFP copolymer). Tetrafluoroethylene/perfluoro-(methyl vinyl ether)/perfluoro(propyl vinyl ether) copolymer (TFE/PMVE/PPVE copolymer) has a melting temperature in between these melting temperature. Thus, in one embodiment of the present invention, when the primer layer comprises TFE/PMVE/PPVE copolymer and the perfluoropolymer in the overcoat is TFE/HFP copolymer, the baking of the overcoat may not be at a high enough temperature to bake the primer layer, in which case the primer layer would be heated to the baked condition prior to applying the overcoat to the primer layer. Alternatively, the primer layer can contain the lower melting perfluoropolymer, in which case the baking of the overcoat would also bake the primer layer.

Melt flowable polytetrafluoroethylene (PTFE), commonly referred to as PTFE micropowder, can also be present in the primer layer or the overcoat in combination with the melt-fabricable copolymers mentioned above, such micropowder having similar melt flow rate. Similarly, minor proportions of non-melt-fabricable PTFE can be present either in the primer layer or the overcoat, or both. In the primer layer the PTFE, if present, aids in stratification towards providing a pure perfluoropolymer in the primer at the primer/overcoat interface. PTFE, if present, in the overcoat aids in coating toughness, but should not be used in proportions that detract from the impermeability of the overall coating to corrosive fluids and the protection of the pipe interior surface provided by the coating. In either case, the primer layer and the overcoat, may be polymer blends with either PTFE or multiple melt-flowable perfluoropolymers, and are still considered perfluoropolymers.

However, as test samples indicate, overcoats (or surface coats that come in contact with bitumen) that have only a minor amount of fluorine incorporated into their polymer structure or wherein minor amounts of fluoropolymer additive (such as PTFE micropowder) are present in substantially non-fluoropolymer coatings show less ability to reduce fouling with respect to bitumen, asphaltenes and the like. In a preferred embodiment of this invention the upper layer of the multi-layer coating comprises a melt flowable copolymer of tetrafluoroethylene which is present in the baked coating layer in an amount greater than 50% by weight, preferably greater than 75%, even more preferably greater than 90%. In a most preferred embodiment the upper layer of the multi-layer coating consists essentially of a baked perfluoropolymer.

The coating is generally formed by as application of liquid-based coating composition. By "liquid-based" is meant that that the coating composition is in the liquid form, typically including a dispersion of perfluoropolymer particles in the liquid, wherein the liquid is the continuous phase. The liquid basis, i.e., the liquid medium can be water or organic solvent. In the case of forming the primer layer, the liquid basis is preferably organic solvent and in the case of the overcoat, the liquid basis is preferably water. Organic solvent may, for example, be present in the overcoat liquid composition in a much smaller amount, e.g., no more than 25% of the total weight of liquid, to improve wetting of the overcoat layer and thereby improve application properties.

The liquid basis of the primer coating composition is preferably organic solvent, which avoids the creation of rust on the cleaned and roughened surface of the metal tube. Rust would interfere with adhesion of the primer layer to the tube surface. Preferably the liquid coating is applied by spraying as will be explained below. The liquid primer coating is applied to the surface of the tube and heated. The heating of the primer layer composition is sufficient to dry the composition to form the primer layer and may even be sufficient to bake the primer layer, prior to the formation of the overcoat. After the primer layer is baked and consolidated, the thickness of the primer layer, after baking, is no greater than about 25 micrometers (1 mil).

The liquid basis of the overcoat composition is preferably water, to minimize the need for solvent recovery. Preferably the liquid coating is applied by spraying as will be explained below. In the case of the liquid-based overcoat, following its application to the dried or baked primer layer, the overcoat is dried and then baked at a sufficiently high temperature, depending on the particular composition used, to melt the overcoat composition to be film forming and the composition of the primer layer as well if not already baked, bonding the primer layer to the overcoat.

Baking consolidates the coating from the dried liquid state to a solid film state. In this regard, the term "baking" is used in its broadest sense of achieving the aforementioned consolidation. Sometimes, the term "curing" is used to describe the film-forming effect; "curing" is included within the meaning of the term "baking". Typically, the baking is carried out by simply heating the coating sufficiently above the melting temperature of the material of the coating to cause the respective material to flow and fuse to become a film-like layer. This allows the overcoat to adhere to the primer layer. Consolidation will generally involve baking of both of the primer layer and the overcoat, either sequentially or simultaneously.

To insure that a thin overcoat does not have pinholes through which corrosive material may pass to ultimately reach the surface of the tube, the step of forming a coating may be carried out by applying multiple coats or layers, one on top of the other, whereby the coating comprising a primer layer and an overcoat has an the overall thickness of the overcoat no greater than 10 mils (254 micrometers), and preferably no greater than 6 mils (152 micrometers). The succeeding coating application of the liquid overcoat composition will fill in any pinholes present in the preceding overcoat.

A preferred ingredient in the primer layer, where the primer is liquid-based, is a heat resistant polymer binder, the presence of which enables the primer layer to adhere to the tube surface. The binder component is composed of polymer which is film-forming upon heating to fusion and is also thermally stable. This component adheres fluoropolymer-containing primer layer to substrates and for film-forming within and as part of a primer layer. The fluoropolymer by itself has little to no adhesion to a smooth substrate. The binder is generally non-fluorine containing and yet adheres to the fluoropolymer.

Examples of the non-fluorinated thermally stable polymers include polyamideimide (PAI), polyimide (PI), polyphenylene sulfide (PPS), polyether sulfone (PES), polyarylene-etherketone, and poly(1,4(2,6-dimethylephenyl)oxide) commonly known as polyphenylene oxide (PPO). These polymers are also fluorine-free and are thermoplastic. All of these resins are thermally stable at a temperature of at least 140° C. Polyethersulfone is an amorphous polymer having a sustained use temperature (thermal stability) of up to 190° C. and glass transition temperature of 220° C. Polyamideimide is thermally stable at temperatures of at least 250° C. and melts at temperatures of at least 290° C. Polyphenylene sulfide melts at 285° C. Polyarylene-etherketones are thermally stable at least 250° C. and melt at temperatures of at least 300° C.

The polymer binder can be applied as an undercoat to the tube surface after treatment to remove contaminants and an organic solvent solution thereof, prior to application of a primer containing polymer binder and fluoropolymer or perfluoropolymer. The resultant dried thin film of polymer binder can further enhance the adhesion of the primer layer to the tube's surface.

For simplicity, only one binder may be used to form the binder component of the composition of the present invention. However, multiple binders are also contemplated for use in this invention, especially when certain end-use properties are desired, such as flexibility, hardness, or corrosion protection. Common combinations include PAI/PES, PAI/PPS and PES/PPS. Typically, the polymer binder content on the primer layer will be from 10-60 wt % based on the combined weight of the perfluoropolymer and polymer binder.

Other ingredients can be present in the primer, such as pigments, fillers, high boiling liquids, dispersing aids, and surface tension modifiers.

In one embodiment application of the coating composition is applied to the interior surface of the heat exchanger tube after removal of contaminants by spraying of the liquid-based composition from a nozzle at the end of a smaller diameter tube extending into the interior of the pipe and along its longitudinal axis. The spraying starts at the far end of the heat exchanger tube and is moved backward along its longitudinal axis as the spray applies the liquid-based coating, until the entire interior surface is coated. As the smaller tube and its nozzle are retracted from the heat exchanger tube, the underlying interior surface is open to receive the sprayed coating.

The preferred liquid which enables the coating composition to be a liquid is one or more organic solvents, within which the perfluoropolymer, present as particles in the preferred embodiment, is dispersed and the polymer binder is present either as dispersed particles or in solution in the solvent. The characteristics of the organic liquid will depend upon the identity of the polymer binder and whether a solution or dispersion thereof is desired. Examples of such liquids include N-methylpyrrolidone, butyrolactone, methyl isobutyl ketone, high boiling aromatic solvents, alcohols, mixtures thereof, among others. The amount of the organic liquid will depend on the flow characteristics desired for the particular coating operation.

The solvent should have a boiling point of 50 to 200° C., so as not to be too volatile at room temperature, but to be vaporized at reasonable elevated temperatures, less than the baking temperature of the perfluoropolymer. The thickness of the primer layer is established by experience with the particular primer composition selected and polymer binder concentrations and the relative amount of solvent that is present. Preferably the primer contains 40 to 75 wt % solvent based on the combined weight of solvent, polymer and polymer binder.

After application of the primer coating to the interior surface of the heat exchanger tube, the smaller tube and nozzle are removed and the pipe is subjected to a heating step to at least dry the coating to form the coating. Typically, the heat exchange tube will be placed in an oven heated to an elevated temperature to vaporize the solvent or to heat the heat exchange tube and its coating to a higher temperature, above the melting temperature of the material of the coating to bake the coating.

After the heating step, the overcoat is spray-applied as a liquid-based composition onto the primer layer, also using a smaller diameter tube and nozzle similar to that used to apply the primer. It has been found that mere drying of the liquid-based primer to form the primer layer may give the layer adequate integrity to withstand further processing, i.e., not be removed by the sliding spray elements across the primer layer surface as the tube/spray nozzle are retracted during spraying of the liquid-based overcoat. To accomplish multiple applications of the overcoat to the primer layer, the overcoat applied in one spray application is baked so that the subsequent spray application can be carried out without scaring or otherwise removing overcoat from the preceding application.

The coated heat exchange tube is baked to melt the overcoat, by placing the tube in an oven heated to the desired temperature. Typically, the baking temperature applied to the overcoat through the thickness of the wall of the tube and the primer layer, will be at least 20° C. above the melting point of the fluoropolymer, with the temperature and time of exposure being sufficient to bake the fluoropolymer. The same is true with respect to the baking of the primer layer.

One preferred embodiment for the process of the present invention can be described as the process for coating the surface of a heat exchanger tube, either the interior or exterior surface, comprising (a) cleaning the surface, (b) grit blasting the surface after the cleaning, (c) applying a liquid-based primer coating to the surface after grit blasting, (d) heating the coating to form a primer layer on the surface, the heating optionally being sufficient to bake the primer layer, (e) applying an overcoat comprising melt-flowable copolymer of tetrafluoroethylene (TFE) and at least one fluorinated copolymerizable monomer on the primer layer, and (f) baking the overcoat.

In another embodiment, the coating comprises a plurality of platelet shaped particles which form a mechanical barrier against permeation of water, solvents and gases to the pipe. In a preferred configuration of this embodiment, the coating comprises a primer layer and an overcoat, and the overcoat includes a multiple coating of a first-applied coating on the primer layer to form a lower layer of the overcoat composition containing a small amount of platelet shaped particles, such as mica dispersed therein.

The platelet shaped particles form a mechanical barrier against permeation of water, solvent and oxygen and improves the impermeability performance of the coating when exposed to corrosive conditions. The platelet shaped particles are typically mica particles, including mica particles coated with oxides or hydrous oxides of titanium, zirconium, aluminum, zinc, antimony, tin, iron, copper, nickel, cobalt, chromium, or vanadium. In the preferred embodiment, mica coated with a mixture of titanium oxide and iron oxide is preferred because it performs better performance in the Atlas Cell test. These particles have an average particle size of about 5 to 200 micrometers, preferably 10-100 micrometers, with no more than 50% of the particles having average particle size of more than 300 micrometers. The mica particles coated with oxide layer are those described in U.S. Pat. Nos. 3,087,827; 3,087,828; and 3,087,829.

The barrier particles constitute 0.05 to 15 wt % of the coating, or 2 to 15 wt % of the lower layer of the overcoat, or 1 to 8% of the entire overcoat. For purposes of the present invention, these percents refer to the combined weight of the perfluoropolymer and particles. The presence of this lower layer further improves the impermeability performance of the coating when exposed to corrosive conditions. In particular, as test results show below, mica coated with a mixture of titanium oxide and iron oxide is preferred.

Following the application of the coating on the lower layer of the overcoat an overcoat upper layer that is free of platelet shaped barrier particles, e.g. mica.

Figure 3:
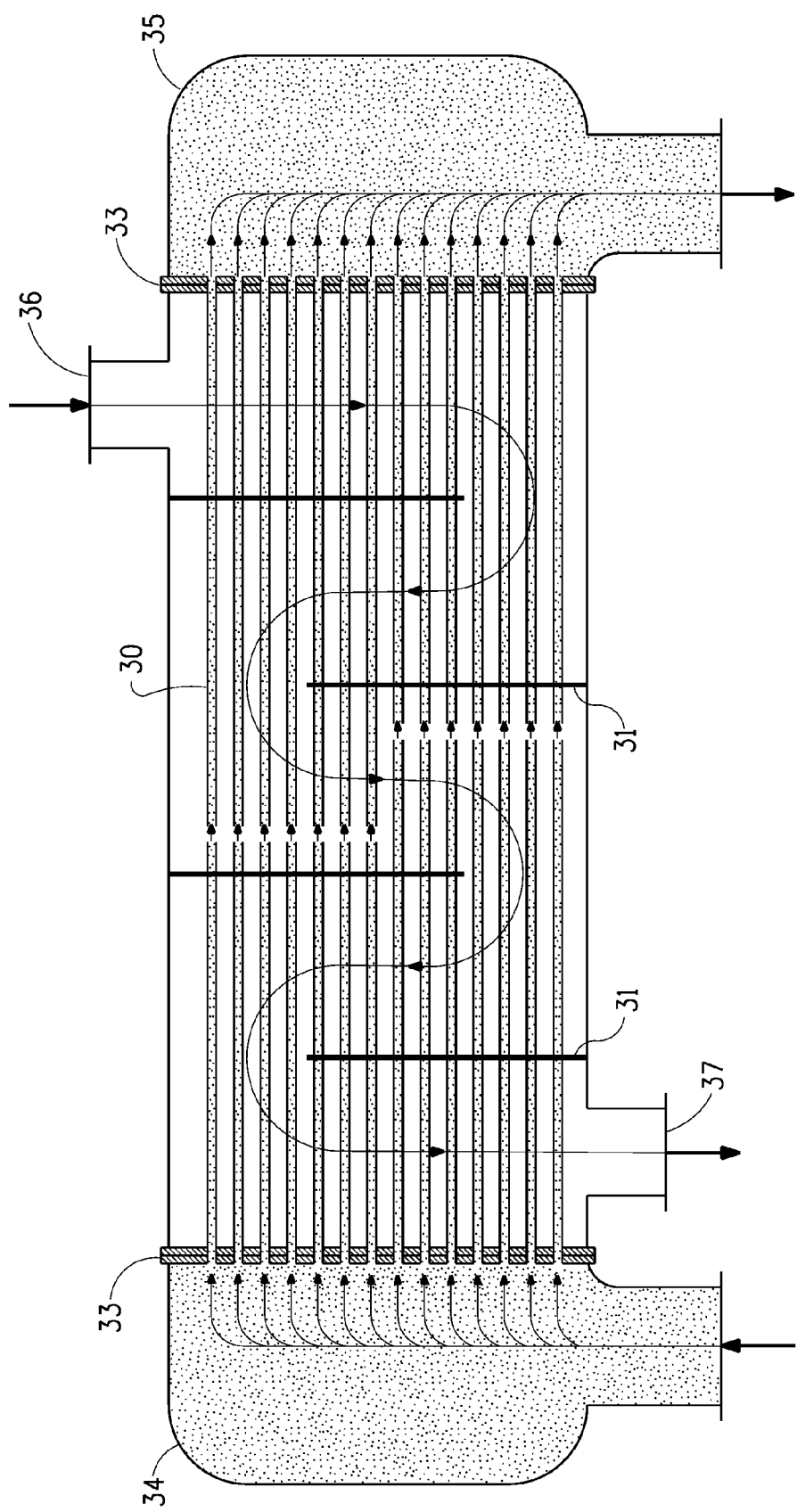
FIG. 3 is a schematic of a straight-tube heat exchange unit used in the water treatment of this invention.

In use, the tubes are assembled together and one example of such an assembly is shown in FIG. 3 where a schematic of a straight-tube heat exchange unit is illustrated. A tube bundle of multiple straight tubes (30) are shown interspersed with baffles (31) and supported at each end by tube sheets (33). Tube-side fluid enters inlet plenum (34) and exits outlet plenum (35). Shell-side fluid enters inlet (36) and exits fluid outlet (37).

The multi-layer coating, which can according to the need be applied tube-side or shell-side or on both sides, acts as both a non-stick surface for the deposits from the treated water stream and also isolates the steel structure of the tube from corrosion. In treatment processes of the present invention, temperatures can reach 350° F. (177° C.) under ideal operation, or can extend to temperatures above 400° F. (200° C.) for related SAGD heat exchange operations or under upset conditions. The materials of the coating are selected to have a melting temperature greater than the temperature of the hottest fluid in the heat exchanger unit. The coating forms a physical barrier to the corrosive environment of the hot fluids. The coating is also resistant to permeation of this corrosive environment through the thickness of the coating. The coating provides the effective permeation resistance.

In another embodiment, the invention relates to a heat exchange unit that comprises at least one tube having a multi-layer coating. The multi-layer coating comprises a melt flowable copolymer of tetrafluoroethylene being applied to adhere to an interior surface or an exterior surface of the at least one tube, the multi-layer coating providing an anti-stick surface that reduces the deposition of foulants during a process that treats a water stream separated from a hydrocarbon-water emulsion during heavy oil recovery from geological formations. The reducing of deposition of foulants from the interior surface or the exterior surface of the at least one tube being in comparison to the interior surface or the exterior surface of the at least one tube without the multi-layer coating being present and thereby avoiding loss of efficiency in heat transfer and pluggage of the heat exchange unit. In one embodiment the multi-layer coating is applied as a liquid composition by spraying the interior or exterior of the tube. In one embodiment the multi-layer coating is adhered to the interior of the tube by applying a primer layer to the interior surface of the tube; disposing an overcoat on top of the primer layer, wherein the overcoat comprises multiple layers including a lower layer and an upper layer and wherein the upper layer has an exterior anti-stick surface consisting essentially of baked perfluoropolymer. In another embodiment the lower layer of the overcoat comprises a plurality of particles which provide a mechanical barrier against permeation of water to the tube. In yet another embodiment the multi-layer coating provides an anti-stick surface that reduces the deposition of residual hydrocarbons, solids and foulants, on the interior or exterior surface of the tube by at least 40%, preferably at least 50%, as compared to the surface of the tube without the multi-layer coating being present. Reductions of at least 60%, 70%, 80% and even at least 90% may be realized. In a further embodiment the at least one tube having a multi layer coating has a thermal conductivity that remains at or above about 0.3 W/m-K over the temperature range of from about 25° to about 260° C.

TEST METHODS

Bitumen Contact Angles

Contact angle is used as a means of determining the affinity of bitumen for a solid surface. Low contact angles suggest total wetting of the surfaces by the bitumen. Large contact angles suggest the surface as an anti-stick surface for bitumen.

Contact angle measurements are made on a VCA2500xe contact angle apparatus made by Advanced Surface Technologies. The VCA2500xe consists of a goniometer with a video camera attached to the stage. The samples are placed into a heated environmental chamber attached to the stage which still allows for measurement of contact angles via the video camera system.

A typical measurement involves transferring a small amount of Athabasca bitumen, ~1.5 microliter, to a sample surface using a glass pipette. Since the viscosity of the bitumen at room temperature is very high the material can not be sucked up into the pipette, but rather physically transferred off the outside of the pipette. Three drops of bitumen were transferred to each surface and the sample heated in the chamber to 100° C., allowed to stand for 10 minutes and the static contact angle is measured with the video camera. The current instrument configuration does not allow for the stage to be tilted when using the video camera. This is repeated in increments of 50° C. up to 250° C. It is noted that upon heating from 100 to 150° C. the drops of bitumen bubble, releasing vapor that is assumed to be the remaining water from a bitumen sample.

Surface texture measurements are also taken during the bitumen adhesive testing. The measurements are done using a Mitutoyo SJ-301 surface roughness tester. The instrument is run under ISO 1997 standards using a Gaussian filter. Five sample intervals are used in the evaluation length. The evaluation length and high and low cutoff filters are determined based on the Ra for the particular sample. These values are taken from a table in the Mitutoyo manual according to ISO 1997 protocols. The instrument is calibrated each day before the start of taking any measurements. Typically three profiles are collected at different places and in different directions across the sample and the calculated parameters averaged. Ra is the arithmetic mean of the absolute values of the profile deviations from the mean line, Atlas Cell Tests Water vapor resistance of coated substrates is tested in a conventional Atlas Cell using ASTM method C868. In accordance with this test, coated substrates are exposed to the liquid-gas interface of boiling deionized water until the coating shows defects such as blistering, bubbling, lack of adhesion, etc. Discoloration of the coating may occur and is an indication of the attack on the mica which may be an early indication that the water vapor will penetrate the coating leading to the defects listed above that corrodes the substrate. Corrosion Resistance of the coated substrate desired is at least about 15 days, preferably at least about 20 days, more preferably at least about 30 days and even more preferably at least about 90 days before any of the defects occur.

Thermal Conductivity

Thermal conductivity is a useful parameter in determining the effectiveness of coatings a heat exchanger surface in that it must be both protective and allow for efficient thermal transfer from one side to the other. Thermal conductivity coating systems are measured at several temperatures from ambient up to a maximum operating temperature of 260° C. Heat capacities are determined using DSC three-curve heat deflection method referencing to that of sapphire standard. Bulk density at 25° C. was calculated from $\rho = (w/\pi r^2 \cdot t)$. Density and thickness are assumed to stay the same at high temperatures as 25° C. Conductivity is calculated using the following formula:

$$\text{Conductivity} = \text{Diffusivity} \times \text{Density} \times Cp.$$

Adhesion Tests

Test panels of cold rolled steel 4.0"×12.0" (10.1 cm×30.5 cm) panels are cleaned with an acetone rinse. The panel has a grit blast surface. The panels are coated according to the description in each of the examples. The panels are subjected to the following two adhesion tests.

(1) Post Boiling Water Fingernail Adhesion(PWA)

Coated test panels are submerged in boiling water for 20 minutes. The water is allowed to come to a full boil after inserting the coated panel, before timing is begun. After the boiling water treatment, the panel is cooled to room temperature and dried thoroughly. The fingernail scratch test involves the use of the fingernail, to chip or peel away the coating from the edge of a deliberate knife scratch in the film, to test the degree of adhesion of the film. If the coating can be pulled away from the substrate for 1 cm or more, the coating is considered to fail the PWA test. If the coating cannot be pulled loose for a distance of 1 cm, the coating is considered to pass the PWA test.

(2) Cross-Hatch Adhesion

Coated substrates are subjected to a cross-hatch (x-hatch) test for adhesion. The coated sample is scribed with a razor blade, aided by a stainless steel template, to make 11 parallel cuts about 3/32 inch (2.4 mm) apart through the film to the metal surface. This procedure is repeated at right angles to the first cuts to produce a grid of 100 squares. The coated and scribed sample is immersed in boiling water for 20 minutes, and then is removed from the water and cooled to room temperature without quenching the sample. Then a strip of transparent tape (3M Brand No. 898), 0.75 by 2.16 inch (1.9 by 5.5 cm), is pressed firmly over the scribed area with the tape oriented in a parallel direction to the scribed lines. The tape is then pulled off at a 90° angle rapidly but without jerking. This step is repeated at a 90° angle to the first step with a fresh piece of tape, and then repeated two times more again at 90° angles to the previous step, each time with a fresh piece of tape. Passing the test requires that no squares be removed from the 100-square grid.

EXAMPLES

In the following Examples, steel panel substrates for coating are cleaned by baking 30 min @ 800° F. (427° C.) and grit blasted with 24 grit aluminum oxide to a roughness of approximately 125-200 microinches (3-5 micrometers) Ra. Liquid coatings are applied by using a spray gun, Model Number MSA-510 available from DeVilbiss located in Glendale Heights, Ill. Epoxy powder coatings are applied by using Nordson manual electrostatic powder spray guns, Model Versa-Spray I located in Amhearst, Ohio.

For determining the adhesion quality, the substrate being coated is a carbon steel panel suitable for use in the PWA Test and the Cross-Hatch Adhesion Test described above.

The primer layers formed in the Examples have the following pre-bake compositions:

TABLE 1

| Liquid Primer 1 | |
| --- | --- |
| Ingredient | Wt % |
| Fluoropolymer | |
| FEP | 12.5 |
| Polymer binder | |
| Polyamideimide | 1.1 |
| Polyethersulfone | 7.6 |
| Polyphenylene Sulfide | |
| Solvents | |
| NMP* | 47.8 |
| Other Organics** | 20.1 |

TABLE 1-continued

| Liquid Primer 1 | |
| --- | --- |
| Ingredient | Wt % |
| Water | |
| Pigments | 9.9 |
| Dispersing Agent | 1.0 |
| Total | 100.0 |

*NMP is N-methyl-2-pyrrolidone
**Other organics may include solvents such as MIBK (methyl isobutyl ketone), hydrocarbons such as heavy naphtha, xylene etc., furfuryl alcohol, triethanol amine or mixtures thereof.
FEP: TFE/HFP fluoropolymer containing 11-12.5 wt % HFP, an average particle size of 8 micrometers and a melt flow rate of 6.8-7.8 g/10 min measured at 372° C. by the method of ASTM D-1238.

The overcoat layers formed in the Examples have the following pre-bake compositions:
The overcoat layers formed in the Examples have the following pre-bake compositions:

TABLE 2

| Liquid Overcoat-Upper Layer | |
| --- | --- |
| Ingredient | Overcoat wt % |
| Perfluoropolymer PFA | 45.0 |
| Other Organics | 1.1 |
| Water | 43.9 |
| Thickener | 0.2 |
| Dispersing Agents | 0.8 |
| Glycerin | 9.0 |
| Total | 100.0 |

PFA: TFE/PPVE fluoropolymer resin containing 3.8-4.8 wt % PPVE having a melt flow rate of 10-17 g/10 min and an average particle size of 35 micrometers.

TABLE 3

| Liquid Overcoat-Lower Layer (Midcoat) | |
| --- | --- |
| Ingredient | Midcoat wt % |
| Perfluoropolymer PFA | 46.9 |
| Glycerin | 9.5 |
| Water | 34.2 |
| Bronze Mica | 4.4 |
| Thickener | 0.9 |
| Dispersing Agents | 0.5 |
| Other Organics | 2.3 |
| Tin Metal | 1.3 |
| Total | 100.0 |

Bronze mica - EM Industries, Affair® 500, 10-60 microns, mica flakes coated with a mixture of titanium dioxide and iron oxide
PFA: TFE/PPVE fluoropolymer resin containing 3.8-4.8 wt % PPVE having a melt flow rate of 10-17 g/10 min and an average particle size of 35 micrometers.

The baking conditions are set forth in the Examples. Good adhesion of the primer layer to the substrate and of the primer layer to the overcoat layer is indicated by their performance in the PWA Test and the Cross-Hatch Adhesion Test.

Example 1

FEP Primer/PFA Overcoat

A layer of primer 1 (liquid FEP) is applied to a prepared steel panel, followed by baking at 150° C. for 10 minutes. The dry film thickness (DFT) of the primer layer is 12-19 micrometers. A layer of overcoat 1 (PFA liquid) is applied over the dried primer layer. This overcoat layer is baked by ramping up the oven temperature to 399° C. from room temperature at 3° C./min. Baking continues for 20 minutes by holding the oven temperature at 399° C. The total DFT is 60-75 micrometers. A second layer of overcoat 3 is applied. It is baked at 371° C. for 20 minutes. The total DFT is 100-125 micrometers and the total thickness of the overcoat is 81-113 micrometers. When the coated carbon steel panel is subjected to the PWA test and Cross-Hatch Adhesion Test, the panel passes both tests. When the coated panel is subjected to the Atlas Cell test it fails due to blistering at about 480 hours Example 2

FEP Primer/Mica-Containing Lower Layer Overcoat/PFA Upper Layer Overcoat

A layer of primer 1 (liquid FEP) is applied to a prepared carbon steel panel, followed by baking at 150° C. for 10 minutes. The dry film thickness (DFT) of the primer layer is 12-19 micrometers. A lower layer overcoat (Midcoat 1) is applied over the dried primer layer. This overcoat layer is baked by ramping up the oven temperature to 399° C. from room temperature at 3° C./min. Baking continues for 20 minutes by holding the oven temperature at 399° C. The total DFT is 60-75 micrometers. An upper layer of overcoat 1 is applied. This overcoat layer is baked by ramping up the oven temperature to 371° C. from room temperature at 3° C./min. Baking continues for 20 minutes by holding the oven temperature at 371° C. The total DFT is 100-125 micrometers and the total thickness of the overcoat is 81-113 micrometers. When the coated carbon steel panel is subjected to the PWA test and Cross-Hatch Adhesion Test, the panel passes both tests. When the carbon steel panel is subjected to the Atlas Cell test it is unaffected and passes at 480 hours.

Example 3

Bitumen Deposition Tests

Contact angles of bitumen for several different coated and non-coated surfaces at several different temperatures along with surface texture measurements are shown in Tables 4 to 7.

A sample of Athabasca bitumen is used in which there remains a large amount of water. The majority of the water is removed by placing a small amount of the bitumen sample onto a piece of plastic positioned at a sloped angle. By working the sample up the slope of the plastic, the majority of the water is separated out and runs to the bottom of the piece of plastic. Additional drying is done by placing this worked material into a vacuum oven and evacuating it at room temperature for 72 hours. The small amount of water remaining boils out when the contact angle measurements are run above 100° C.

Two bare metal samples of T95 alloy and carbon steel are used as representatives of bare heat exchange tubes. Measurements are made on the steel surfaces as received and after polishing to a near mirror surface.

A fusion bonded epoxy sample (FBE) is prepared on erosion coupons used in ASTM G75-07. The coating material is obtained from DuPont Performance Coatings under the product code Nap-Gard 7-0008. A layer of coating FBE powder is applied to a prepared steel panel, followed by baking at 316° C. for 20 minutes. The dry film thickness (DFT) of the paint layer is 100-125 micrometers Coupons are also prepared with fluoropolymer multi-layer coating in accordance with the procedure set forth for Example 2.

The above coatings are applied on surfaces that have been roughened by grit blasting with aluminum oxide 24 grit at 100 psi to a surface roughness of 125-200 microinches RA (3-5 micrometers).

TABLE 4

Contact Angles and Surface Roughness for T95 Carbon Steel

| Temp. Tested | as received Average | after polishing Average |
|---|---|---|
| | Measured Contact Angles (degrees) | |
| 100 C. | 22 | 10 |
| 150 C. | 0 | 7 |
| 200 C. | 0 | 2 |
| 250 C. | 0 | 0 |
| | Surface Roughness for Samples | |
| Ra (µm) | 3.82 | 0.01 |

TABLE 5

Contact Angles and Surface Roughness for Carbon Steel Plate

| Temp. Tested | as received Average | after polishing Average |
|---|---|---|
| | Measured Contact Angles (degrees) | |
| 100 C. | 18 | 11 |
| 150 C. | 10 | 9 |
| 200 C. | 6 | 5 |
| 250 C. | 3 | 0 |
| | Surface Roughness for Samples | |
| Ra (µm) | 0.59 | 0.01 |

TABLE 6

Contact Angles and Surface Roughness for Epoxy coatings

| Temp. Tested | FBE Average |
|---|---|
| | Measured Contact Angles (degrees) |
| 100 C. | 16 |
| 150 C. | 4 |
| 200 C. | 0 |
| 250 C. | 0 |
| | Surface Roughness for Samples |
| Ra (m) | 0.07 |

TABLE 7

Contact Angles and Surface Roughness for Fluoropolymer Coating

| Temp. Tested | Sample 1 Average | Sample 2 Average |
|---|---|---|
| | Measured Contact Angles (degrees) | |
| 100 C. | 67 | 54 |
| 150 C. | 56 | 58 |
| 200 C. | 55 | 51 |
| 250 C. | 55 | 46 |
| | Surface Roughness for Samples | |
| Ra (µm) | 4.82 | 0.66 |

As can be seen from the data, the effect of polishing to reduce the surface roughness has little effect upon the measured contact angles.

For both carbon steels, the contact angle is so low that it suggests total wetting of the surface at the higher temperatures.

The fusion bonded sample has a very smooth surface compared to the two part epoxy sprayed onto a carbon steel panel. The epoxy system shows very low contact angles suggesting total wetting of the surfaces by the bitumen.

Table 7 contains the results for the fluoropolymer based coating system. Larger contact angles in the 45 to 65° range are noted. These contact angles appear to be independent of temperature and surface roughness. The contact angles are substantially greater than for the non-coated carbon steels and epoxy coatings and provide an anti-stick surface for bitumen.

cation that the multi-layer coating of this invention applied to the surface of a heat exchange tube will permit efficient thermal transfer and thereby avoids or minimizes loss of efficiency in heat transfer in use.

For comparison, the conductivity of a fusion bonded epoxy coating is determined. Coated glass samples which are gold-sputtered and graphite sprayed as of above are tested in the same manner.

Coated glass specimens ½" (12.7 mm) thick are sputtered with gold and sprayed with graphite. The diffusivities are taken in four (4) successful shots in Xenon Nanoflash with a filter allowing 25% power reaching the specimen in a short pulse. The gain is set at 5002-2520 (304V) and for a duration of 686 ms for coatings at 25° C. Gains set at 1260, 623, 315 for 140° C., 200° C., 260°-270° C., respectively; the duration at 840-950 ms. Temperature is controlled with a circulation bath, but with difficulty due to fluctuations at 260°-270° C. The IR detector was chilled with liquid nitrogen. Thermal transient properties are given in Table 9.

TABLE 9

Thermal Conductivity Epoxy Coating

| Sample | Thickness mm | Density g/cm$^3$ | Temp | Cp J/g-K | Diffusivity mm$^2$/s | Conductivity W/m-K |
|---|---|---|---|---|---|---|
| 4-2 | 0.320 | 1.278 | 25° C. | 1.027 | 0.201 ± 0.001 | 0.264 ± 0.002 |
| | | | 140° C. | 1.730 | 0.162 ± 0.001 | 0.359 ± 0.002 |
| | | | 200° C. | 1.857 | 0.128 ± 0.005 | 0.304 ± 0.012 |
| | | | 260° C. | 1.955 | 0.110 ± 0.004 | 0.275 ± 0.011 |

Example 4

Thermal Conductivity Analysis

Similar to the sample preparation of coated substrates in Example 2, a three coat fluoropolymer system is applied to glass substrate without gritblasting The black primer is visible through the glass.

Coated glass specimens ½" (12.7 mm) thick are sputtered with gold and sprayed with graphite. Diffusivities are taken in 4 successful shots in Xenon Nanoflash with a filter allowing 25% power reaching the specimen in a short pulse. The gain is set at 5002-2520 (304V) and duration at 150 and 42 ms for coatings at 25° C., 1260-623 and 156 and 40 ms for 140° C. At 200° C., the gain is decreased to at 623-315 (304V) and duration at 146 and 50 ms. At 260° C., the gain is set at 155-78.8, duration at 150-60. Temperature is controlled with a circulation bath, but with difficulty due to fluctuations at 260°-264° C. The IR detector was chilled with liquid nitrogen. Thermal transient properties are given in Table 8.

For the epoxy specimen 4-2 there is a glass transition near 105° C. shown as heat capacity stepwise increases and it continues to increase with temperature. Above 200° C., diffusivity decreases result in thermal conductivity decreasing indicating poorer heat transfer properties than the multi-layer fluoropolymer coating.

Example 5

Atlas Cell Test with Mica Variation in Midcoat

Similar to the procedure used in Example 3, 8"×8" steel panels are prepared with the only exception that when the coatings are applied, the type of mica used in the lower layer overcoat (Midcoat 1) is varied. The panels are subjected to Atlas Cell testing using ASTM C868 to determine durability.

The mica platelets vary in thickness from 0.1-5 microns. The micas are all coated with thin controlled thickness layers

TABLE 8

Thermal Conductivity of Multi-layer Fluoropolymer Coating

| Sample | Thickness mm | Density g/cm$^3$ | Temp | Cp J/g-K | Diffusivity mm$^2$/s | Conductivity W/m-K |
|---|---|---|---|---|---|---|
| 4-1 | 0.179 | 1.216 | 25° C. | 0.883 | 0.350 ± 0.001 | 0.376 ± 0.001 |
| | | | 140° C. | 1.089 | 0.317 ± 0.000 | 0.420 ± 0.000 |
| | | | 200° C. | 1.210 | 0.284 ± 0.002 | 0.418 ± 0.003 |
| | | | 260° C. | 1.523 | 0.260 ± 0.001 | 0.482 ± 0.002 |

At 260° C., which is in the melting region of fluoropolymer systems, the heat capacity (Cp) increases sharply, diffusivity decreases somewhat and the resulting thermal conductivity goes up. The thermal conductivity of sample 4-1 is an indiof Titanium dioxide. The titanium dioxide can be from two mineral forms, rutile and anatase. The thickness of the mica produces a light interference effect that may produce a color. Some colors are intensified with small amounts of iron oxide.

TABLE 10

Colored micas tested, all from EM Industries, Afflair ® product line

| Afflair code | Color Name | TiO2 coating type | Particle range (microns) |
|---|---|---|---|
| 235 | Green Pearl | Rutile | 10-60 |
| 500 | Bronze | Anatase | 10-60 |
| 119 | Polar White | Rutile | 5-25 |
| 100 | Silver Pearl | Anatase | 10-60 |
| 307 | Gold | Anatase | 10-60 |
| 7219 | Lilac | — | — |
| 225 | Pearl Blue | Rutile | 10-60 |

TABLE 11

Atlas Cell Results

| Panel | Primer dft | Midcoat mid-color | Midcoat dft | Overcoat dft | atlas hrs. | comments |
|---|---|---|---|---|---|---|
| 5-1 | 0.82 | white | 2.29 | 2.55 | 24 | failure, yellow burn color |
| 5-2 | 0.8 | lilac | 3.09 | 1.79 | 380.9 | slight color deterioration |
| 5-3 | 0.9 | silver | 1.99 | 1.89 | 24 | failure, yellow burn color |
| 5-4 | 0.85 | blue | 2.87 | 1.49 | 451.1 | passes, severe color degegation |
| 5-6 | 0.91 | gold | 2.12 | 1.19 | 285 | failure, severe blisters |
| 5-7 | 0.91 | green | 1.93 | 2.55 | 24 | failure, yellow burn color |
| 5-8 | 0.93 | bronze | 2.54 | 1.66 | 721 | passes |

Failure indicates the development of defects such as blistering, bubbling or lack of adhesion. Passing means no development of defects.
Discoloration is an early indication that water may penetrate the coating and cause defects.

Example 6

Bitumen Deposition Tests

Fluoropolymer containing coatings are assessed for bitumen and asphaltenes adhesion in a bitumen froth separation vessel used for the processing of mined oil sands.

Similar to the procedure used in Example 2, Sample 6-1 is prepared using carbon steel strips measuring 25.4 mm wide× 3.2 mm thick×500 mm long. A set of three coated samples connected in length by stainless steel rings are suspended into the bitumen froth separation vessel for 14 days-8 days of operation at a temperature of 80° C.; and 6 days at room temperature. The froth contains about 60% bitumen, 30% water and 10% solids such as minerals and fines.

For comparison, Sample 6-2 is prepared by coating three sets of carbon steel strips with a predominantly high gloss clear aliphatic polyurethane based polymer having a small amount of perfluorinated acrylic monomer used to make one of the polymers in this two package system.

Sample 6-3, represent three sets of uncoated carbon steel strips immersed under the same conditions in the bitumen froth separator as a control.

After testing, Sample 6-1 (multi-layer fluoropolymer of this invention) has an excellent appearance when removed from the bitumen froth vessel. The coating appears undamaged and is clean showing almost no deposit for the strips whether located at the bottom or top of the vessel. The sample is determined to have very little weight gain from asphaltene/bitumen adhesion over the course of the test. What little deposit is present is easily removed with light brushing indicating the anti-stick nature of the surface.

Sample 6-2 which contains only a minor amount of fluorine in its polymer composition does not do well in this test. The coating on the strip at the bottom of the vessel are only loosely attached. In the middle section, broken off pieces attached to bitumen are observed. For the strip located at the top of the vessel, the coating is completely detached. Weight gains for the sample are comparable to that of carbon steel offering no anti fouling benefits.

Example 7

Inorganic Scale Deposition Test

FEP and PFA from the foregoing Examples are subjected to coupon immersion testing in brine solutions in order to determine the reduction in inorganic scale deposition of the coated coupon, with the result being that scale deposition was reduced by more than 50 wt % as compared to the uncoated coupons. These tests are done by soaking coated and uncoated steel coupons in calcite and barite brine solutions having the following compositions:

| Brine A | g/kg water | Brine B | g/kg |
|---|---|---|---|
| $CaCl_2 \cdot 2H_2O$ | 36.87 | same | 8.6 |
| KCl | 11.43 | same | 4.38 |
| $MgCl_2 \cdot 6H_2O$ | 1.8 | same | 0.41 |
| NaCl | 138.9 | same | 89.09 |
| $Na_2SO_4$ | 0.32 | — | — |
| — | — | $BaCl_2$ | 3.08 |

The coupons are suspended for two days under 100 psi (6.9 MPa) pressure in either in Brine A heated at 140 F (60° C.) or in Brine B heated at 90° F. (32° C.) and the weight pickups (scale deposition) for the coated coupons were compared to that for the uncoated steel coupons to reveal the reduction in scale deposition for the coupons coated with linings of the present invention.

What is claimed is:

1. A process for treating a water stream produced in the recovery of heavy oil from geological formations comprising:
   a) injecting steam or warm water underground into a geological formation containing hydrocarbons and establishing a steam chamber;
   b) transferring heat from said steam chamber to said formation and mobilizing hydrocarbons for extraction from said formation;
   c) extracting said mobilized hydrocarbons from said formation and said hydrocarbons forming an emulsion with a portion of condensed water formed from said steam;
   d) separating mobilized hydrocarbons as a heavy oil product from said hydrocarbon-water emulsion to produce a water stream containing foulants that include residual hydrocarbons and solids;
   e) passing said water stream through a heat exchange unit comprising at least one tube wherein said tube has a multi-layer coating comprising a melt flowable copolymer of tetrafluoroethylene adhered to the interior surface or exterior surface of said tube, wherein said multi-layer coating is adhered to the interior surface or exterior surface of said tube by applying a primer layer to the surface of said tube; disposing an overcoat on top of said primer layer, wherein said overcoat comprises multiple layers including a lower layer and an upper layer and wherein said upper layer has an exterior anti-stick surface consisting essentially of baked perfluoropolymer; and f) removing said foulants from said water stream while altering the temperature of said water stream as said water stream passes through said heat exchange unit; wherein said multi-layer coating provides an anti-stick surface that reduces the deposition of foulants, on the interior or exterior surface of said tube as compared to the surface of said tube without said multi-layer coating being present, so as to avoid loss of efficiency in heat transfer and pluggage of said heat exchange unit.

2. The process of claim 1 wherein the water stream containing said foulants comprises about 500 ppm hydrocarbons to about 25,000 ppm hydrocarbons.

3. The process of claim 1 wherein the temperature of said water stream is altered in one or more heat exchange units by an amount of at least about 25° C. as said stream passes through said heat exchange unit.

4. The process of claim 1 wherein the temperature of said water stream is altered by reducing the temperature of said water stream in one or more heat exchange units from about 220° C. to about 70° C.

5. The process of claim 1 wherein the flow of said water stream through said heat exchange unit is from about 1 ft/s (0.3 m/s) to about 5 ft/s (1.5 m/s).

6. The process of claim 1 wherein the contact angle of said coating with respect to bitumen is at least about 35 degrees.

7. The process of claim 1 wherein the coated tube has a corrosion resistance as measured by Atlas Cell of at least about 15 days.

8. The process of claim 1 wherein said multi-layer coating is applied as a liquid composition by spraying the interior or exterior of the tube.

9. The process of claim 1 wherein said lower layer of said overcoat comprises a plurality of particles which provide a mechanical barrier against permeation of water to the tube.

10. The process of claim 1 further including the step of removing contaminants from the interior or exterior surface of the tube by cleaning said interior or exterior surface and roughening the cleaned interior or exterior surface prior to adhering said multi-layer coating.

11. The process of claim 1 wherein the heat exchange unit comprises at least one tube having an inner diameter of about 0.375 in (0.95 cm) to about 2.0 in (5.1 cm).

12. The process of claim 1 wherein said tube having a multi layer coating has a thermal conductivity that remains at or above about 0.3 W/m-K over the temperature range of from about 25° to about 260° C.

13. The process of claim 1 wherein said multi-layer coating provides an anti-stick surface that reduces the deposition of residual hydrocarbons, solids and foulants, on the interior or exterior surface of said tube by at least 40% as compared to the surface of said tube without said multi-layer coating being present.

* * * * *